(12) United States Patent
Hoos et al.

(10) Patent No.: US 12,329,166 B2
(45) Date of Patent: Jun. 17, 2025

(54) DOUGH PROCESSING DEVICE AND DOUGH PROCESSING FACILITY

(71) Applicant: FRITSCH BAKERY TECHNOLOGIES GMBH & CO. KG, Markt Einersheim (DE)

(72) Inventors: Josef Hoos, Markt Einersheim (DE); Markus Fackelmann, Sommerach (DE); Frank Van Der Wal, Markt Einersheim (DE); Michael Gier, Kitzingen (DE)

(73) Assignee: FRITSCH BAKERY TECHNOLOGIES GMBH & CO. KG, Markt Einersheim (DE)

( * ) Notice: Subject to any disclaimer, the term of this patent is extended or adjusted under 35 U.S.C. 154(b) by 0 days.

(21) Appl. No.: 17/950,828

(22) Filed: Sep. 22, 2022

(65) Prior Publication Data

US 2023/0086905 A1 Mar. 23, 2023

(30) Foreign Application Priority Data

Sep. 22, 2021 (DE) .......................... 102021124557.5

(51) Int. Cl.
*A21C 3/02* (2006.01)

(52) U.S. Cl.
CPC .............. *A21C 3/027* (2013.01); *A21C 3/024* (2013.01)

(58) Field of Classification Search
CPC ............ A21C 3/02; A21C 3/027; A21C 3/028
See application file for complete search history.

(56) References Cited

U.S. PATENT DOCUMENTS

| 2,699,737 | A | * | 1/1955 | Sticelber | ................. | A21C 3/02 |
| | | | | | | 425/363 |
| 4,631,017 | A | | 12/1986 | Hayashi | | |

(Continued)

FOREIGN PATENT DOCUMENTS

| AT | 502 608 A1 | 4/2007 |
| CN | 205431794 U | 8/2016 |

(Continued)

OTHER PUBLICATIONS

German Search Report Dated Jun. 2, 2022, Application No. 10 2021 124 557.5, Applicant Fritsch Bakery Technologies Gmbh & Co. KG, 5 Pages.

(Continued)

*Primary Examiner* — S. Behrooz Ghorishi
*Assistant Examiner* — Alexander A Wang
(74) *Attorney, Agent, or Firm* — BROOKS KUSHMAN P.C.

(57) ABSTRACT

A dough processing device having a conveyor configured to convey dough in a production direction, and a rolling station. The rolling station includes a satellite roller having a drum and at least two rollers configured to engage the dough, wherein the drum is rotatable about a drum axis, and the rollers are revolvable about the drum axis by rotation of the drum. The rolling station further includes a counter roller disposed opposite the satellite roller, wherein the rolling station is configured to roll the dough between the satellite roller and the counter roller. The rolling station includes a first guiding element configured to confine an evasion of the dough in a first confinement direction oriented transversely with respect to the production direction, wherein the first guiding element is further configured to support the conveying of the dough.

20 Claims, 4 Drawing Sheets

(56) References Cited

U.S. PATENT DOCUMENTS

| | | | |
|---|---|---|---|
| 4,692,107 A | 9/1987 | Morikawa et al. | |
| 5,310,569 A * | 5/1994 | Muller | A21C 1/003 |
| | | | 426/504 |
| 5,804,225 A | 9/1998 | Hayashi | |
| 7,910,148 B2 | 3/2011 | Hayashi et al. | |
| 2004/0065210 A1* | 4/2004 | Hayashi | A21C 3/027 |
| | | | 99/331 |

FOREIGN PATENT DOCUMENTS

| | | |
|---|---|---|
| DE | 24 45 918 A1 | 4/1976 |
| EP | P161076 A1 | 11/1985 |
| EP | 0197671 A1 | 10/1986 |
| EP | 0947136 A2 | 10/1999 |
| EP | 1203533 A | 5/2002 |
| EP | 1230857 A | 8/2002 |
| EP | 1 230 857 B1 | 6/2004 |
| EP | 1 203 533 B1 | 5/2006 |
| IT | VI20110142 A1 | 11/2012 |
| JP | S464870 Y1 | 2/1971 |
| JP | S61-209541 A | 9/1986 |
| JP | H08-298916 A | 11/1996 |
| JP | H09-19256 A | 1/1997 |
| JP | 2004008157 A | 1/2004 |

OTHER PUBLICATIONS

Notification and Third Party Submission for Japanese Patent Application No. 2022-151639, mailed Jul. 24, 2023, 12 Pages (including English translation).

Notice of Reasons for Refusal for Japanese Patent Application No. 2022-151639, mailed Jul. 19, 2023, 12 Pages (including English translation).

First Office Action for Canadian Application No. 3,175,388, dated Jan. 2, 2024, 4 Pages.

European Search Report for EP Application No. 22196296.2-1002, dated Feb. 2, 2025, 18 pages (including English translation).

Third Party Observation for EP Application No. 22196296.2-1002 / 4154716, dated Mar. 7, 2024, 6 pages.

Third Party Observation for EP Application No. 22196296.2-1002 / 4154716, dated Oct. 24, 2024, 3 pages.

Extended European Search Report for Application No. 22196296.2-1002, mailed Jan. 25, 2023, 8 Pages.

* cited by examiner

DOUGH PROCESSING DEVICE AND DOUGH PROCESSING FACILITY

CROSS-REFERENCE TO RELATED APPLICATIONS

This application claims foreign priority benefits under 35 U.S.C. § 119(a)-(d) to German patent application number DE 10 2021 124 557.5, filed Sep. 22, 2021, which is incorporated by reference in its entirety.

TECHNICAL FIELD

The disclosure is directed to dough processing devices configured to roll a dough.

BACKGROUND

EP 1 230 857 B1 discloses a dough sheeter which is supposed to form a dough sheet from a shapeless dough mass. Such devices are employed at the beginning of a dough processing facility because a shapeless dough mass is delivered there, out of which a dough sheet has to be formed in order to enable further processing. To that end, according to EP 1 230 857 B1, the dough mass is rolled by two forming rollers. Further, guide discs are provided, which are disposed at end faces of the forming rollers in such way that the guide discs cover a gap provided between the forming rollers in a direction transverse to a transit direction.

A device and a method for kneading and rolling of a food dough strip is known from AT 502 608 A1. The device disclosed therein comprises a roller for conveying and rolling as well as a planetary rolling mechanism having several planetary rollers. The latter are disclosed to knead and roll the food dough strip. Devices such as the ones described in the above documents have so far only been employed for processing of dough sheets which had already been formed. That is, dough processing facilities for generating dough products normally comprise a dough sheet former, which generates a dough sheet from a dough mass, and a further device, which kneads and rolls the previously generated dough band. In this way, facilities are created, which require large floorspace. So far, such facilities are only feasible for large operations.

SUMMARY

It is an object of the disclosure to provide a dough processing device which enables a more compact design of dough processing facilities for generating dough products, in which the dough processing device is employed. This may enable optimization of the production for small operations as well.

A dough processing device is disclosed having a conveyor, which is configured to convey the dough in a production direction, and a rolling station. The rolling station comprises a satellite roller having a drum and at least two rollers, which are configured to engage the dough, wherein the drum is rotatable around a drum axis, and wherein the rollers are revolvable about the drum axis by a rotation of the drum. The rolling station further comprises a counter roller, which is disposed opposite the satellite roller, wherein the rolling station is configured to roll the dough between the satellite roller and the counter roller. The rolling station comprises a first guiding element, which is configured to confine an evasion of the dough in a first confinement direction, which is oriented transversely, preferably perpendicularly, with respect to the production direction, wherein the guiding element is further configured to support the conveying of the dough.

Various measures reducing the braking effect of the guiding element on the dough may be considered as supporting the conveying of the dough. For example, a corresponding movability of the guiding element or friction reducing measures such as an anti-stick coating of the guiding element or application of a separating agent, for example flour or oil, onto the guiding element, are conceivable. The expression dough as used above and in the following with respect to the subject matter of the application may refer to dough in various conceivable forms, for example in the shape of a substantially unformed dough mass, in the form of substantially unformed dough portions, in the form of a substantially unformed dough strand, in the form of a dough sheet formed to a certain dimension or in any transition forms between the ones previously listed.

By providing a guiding element, application of the dough processing device having a satellite roller for forming of a dough sheet may be enabled. At the same time the device may execute the function of rolling and kneading such that this function does not need to be fulfilled by an additional device downstream of the dough sheeter. By enabling this double function, the need for an additional device for rolling and kneading of the dough sheet may be eliminated and, therefore, floorspace may be saved.

It may be advantageous if the dough processing device comprises a second guiding element, which is configured to confine an evasion of the dough in a second confinement direction which is oriented opposite to the first confinement direction. This may enable generating a dough sheet having a defined width. It is particularly advantageous, if the second guiding element is disposed opposite of the first guiding element with respect to the satellite roller and/or the counter roller. Thereby, the two guiding elements, the satellite roller and the counter roller may define a gap, which enables a particularly accurate forming of the dough sheet.

It is conceivable that the first and/or the second guiding element respectively has a rotary disc. In this way a continuous support of the conveying of the dough may be achieved in a particularly simple way.

It is particularly advantageous, if the rotary disc is drivable, preferably motorized and/or synchronized with a conveying speed of the conveyor. A disk drivable directly or indirectly, for example through a transmission, by a motor, for example an electric motor may be considered a motorized drivable rotary disc. A rotary disc may be considered as drivable synchronized with a conveying speed of the conveyor if a change in conveying speed of the conveyor automatically causes a change in driving speed of the disc. Synchronizing the drive of the rotary disc with the conveying speed of the conveyor may be achieved by coupling the rotary disc with a drive of the conveyor. In particular, the rotary disc may be connected to the drive of the conveyor by a transmission. It is also conceivable that the speed of a motor directly or indirectly driving the rotary disc is adjustable based on the conveying speed of the conveyor.

It may be advantageous, if the rollers each are rotatable about a roller axis, which are oriented parallel a with respect to the drum axis. In such a configuration, the rollers may roll on the dough sheet during engagement with the dough sheet. This may reduce friction between the dough sheet and the roller and thereby reduce stress in the dough.

It is conceivable, that the drum has two plates, wherein the rollers are each disposed between the two plates. It is particularly beneficial, if the rollers each are supported rotatably at the two plates. As already mentioned, the rollers may roll on the dough sheet during engagement with the dough sheet in such a configuration. This may reduce friction between the dough sheet and the roller thereby reducing stress and the dough.

Advantageously, a distance, oriented parallel the with respect to the drum axis may respectively be provided between the plates and the rollers. It is particularly beneficial if the distance is dimensioned to at least partially receive the guiding element or one of the guiding elements, respectively. This may enable the guiding element or the guiding elements, respectively, to be disposed as close as possible to the rollers, such that as little dough as possible can reach between the rollers and the guiding element or the guiding elements, respectively.

The application also relates to a dough processing facility for producing dough products comprising a dough processing device of the type described above. It is particularly beneficial, if the dough processing device is configured to form a dough sheet from a substantially unformed dough mass.

A dough processing facility may comprise further working stations in addition to the dough processing device. By way of example, cutting stations, laminating devices, filling stations or sprinkling stations are conceivable. A dough mass may be considered substantially unformed, if it has not yet been formed, for example rolled and/or cut, to a predefined dimension. A substantially unformed dough mass may be considered to be for example a dough strand, which has been generated from several portions of defined mass and merely rolled to connect the portions but not to a predefined thickness. A dough sheet may be a sheet shaped mass of dough, which has been purposefully formed, for example rolled and/or cut, in order to achieve a predefined dimension, in particular a predefined width and a predefined thickness.

BRIEF DESCRIPTION OF THE DRAWINGS

The disclosure relates to a dough processing device or a dough processing facility, respectively, of the previously described type. In the following, a preferred embodiment will be described as an example in more detail using drawings.

FIG. 3A is a detailed view of a section of FIG. 3; and

DETAILED DESCRIPTION

Figure 1:
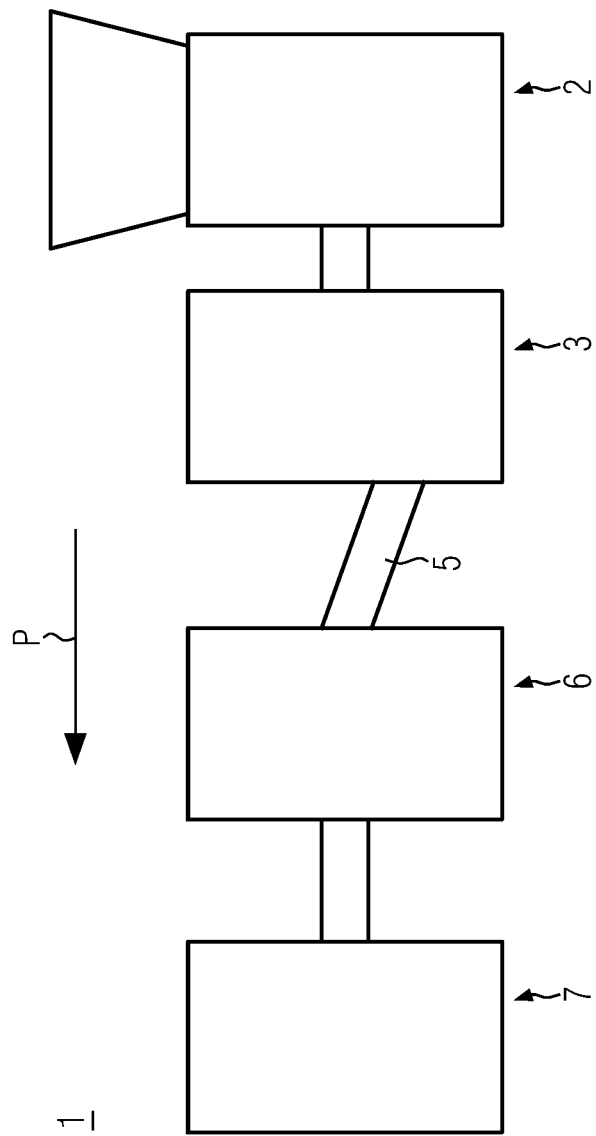
FIG. 1 shows a schematic side view of a dough processing facility having different stations.

In FIG. 1, a schematic side view of a dough processing facility 1 is illustrated. The dough processing facility 1 may comprise several stations. Between the stations, dough may be conveyable by different conveyors. At the beginning of the dough processing dough may be filled into a portioning station 2. The dough processing facility 1 may comprise the portioning station 2. The portioning station 2 may be adapted to divide the dough mass filled into it into portions having a desired mass. This may enable that a specifically defined mass of the dough is processed by the dough processing facility 1.

The dough processing facility 1 may further comprise a dough sheeting station 3. The dough sheeting station 3 may be configured to form a dough sheet 4 (see FIG. 2) from a substantially unformed strand of dough portions. This will be explained further and the following. A conveyor 5 may be provided. The dough sheet 4 may be laid down on the conveyor 5. The conveyor 5 may be configured to convey dough, in particular the dough sheet 4 in a production direction P. Downstream of the dough sheeting station 3, further stations for processing the finally formed dough sheet 4 may be provided, as illustrated in the embodiment. As illustrated in FIG. 1, the dough processing facility 1 may comprise a first working station 6. It is further conceivable, that, as also illustrated in FIG. 1, the dough processing facility may comprise a second working station 7. One or more of the working stations 6, 7 may be a cutting station. However, a plurality of different kinds and types of working stations are conceivable.

Figure 2:
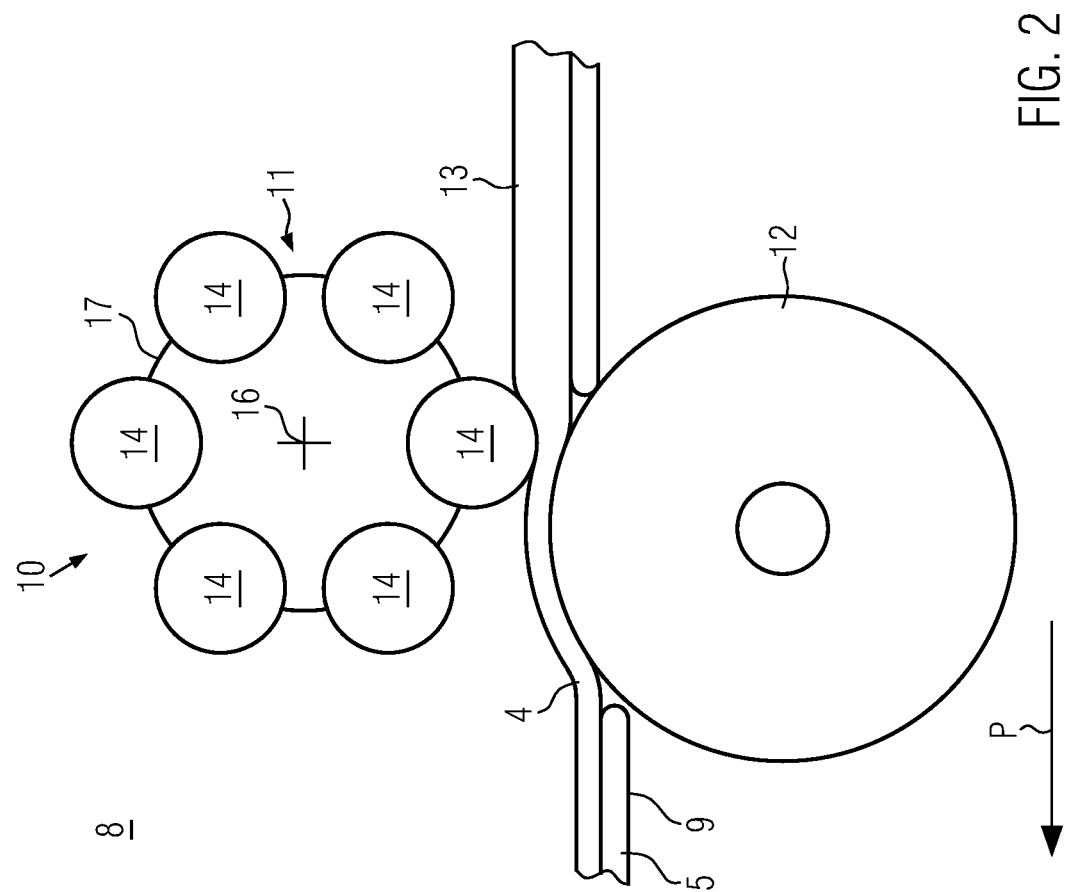
FIG. 2 shows components of a dough processing device in a schematic sectional view from the side.

As in the present embodiment, the dough sheeting station 3 may comprise a dough processing device 8. In FIG. 2, components of the dough processing device 8 are shown in a schematic sectional view from the side. The dough processing device 8 may comprise the conveyor 5. The conveyor 5 may for example include a conveyor belt 9. The dough processing device 8 may further comprise a rolling station 10. As shown in FIG. 2, the rolling station 10 may comprise a satellite roller 11. The rolling station 10 may further comprise a counter roller 12. The satellite roller 11 and the counter roller 12 may be disposed opposite one another. The rolling station 10 may be configured to roll dough between the satellite roller 11 and the counter roller 12. Thereby, a substantially unformed dough strand 13 may be formed into a dough sheet 4. In the following, "dough" may be used as a summarizing term for the formed dough sheet, the substantially unformed dough strand 13 as well as for the dough in transitional states between dough strand 13 and dough sheet 4. The satellite roller 11 may comprise at least two rollers 14. In the present embodiment, six rollers 14 are provided. The rollers 14 may be configured to engage the dough.

Figure 3:
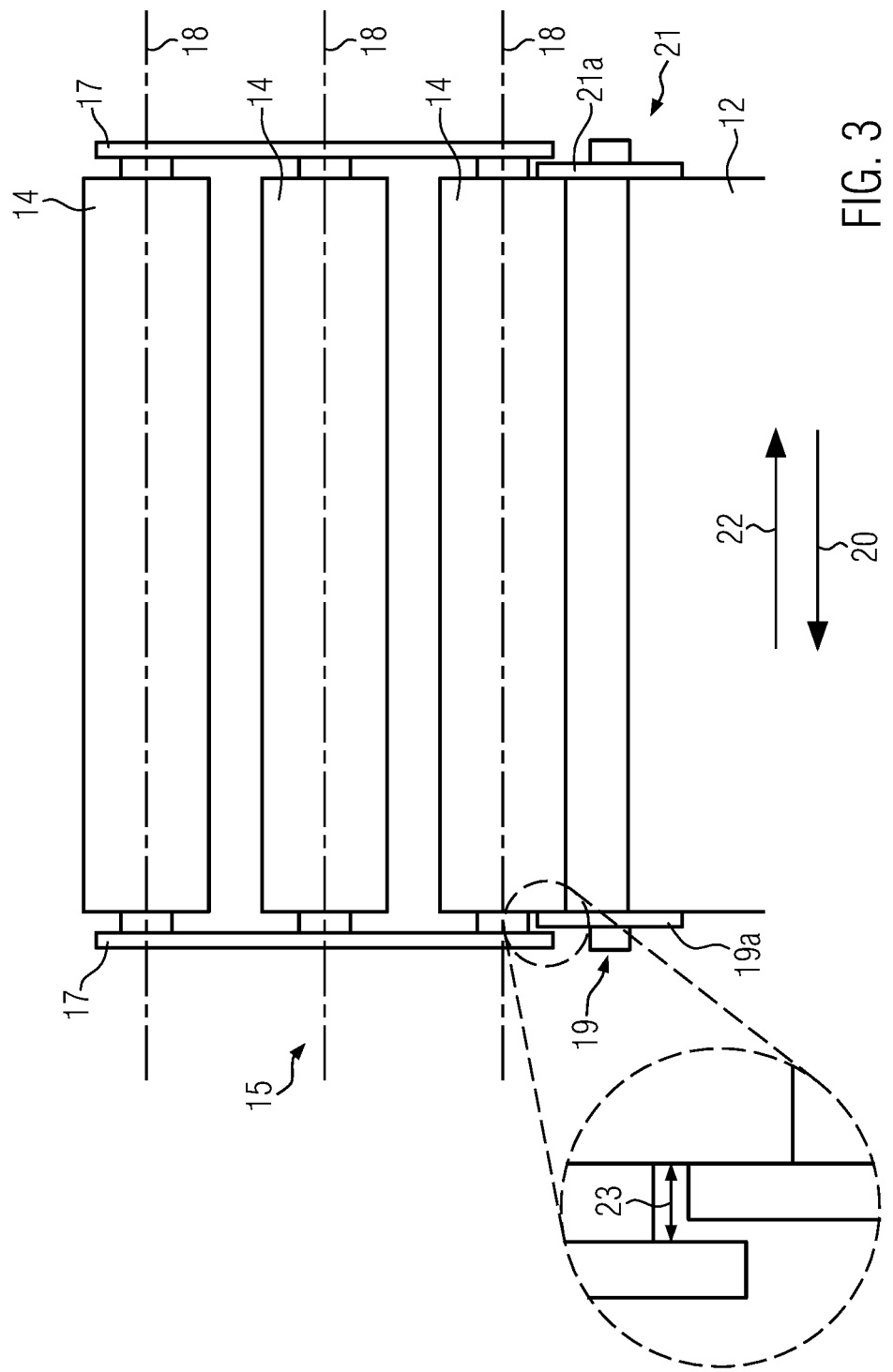
FIG. 3 shows a schematic frontal view of a dough processing device in a perspective directed opposite to the production direction.

In FIG. 3, components of the dough processing device are illustrated in a schematic frontal view in a perspective opposite with respect to the production direction P. Now it can be seen that the satellite roller 11 may comprise a drum 15. The drum 15 may be rotatable about a drum axis 16 (see FIG. 2). The drum may, as shown in FIG. 3, have two plates 17. The rollers 14 may each be disposed between the two plates 17. The rollers 14 may each be rotatably supported at the plates 17. In general, the rollers 14 may each be rotatable about a rolling axis 18. The rolling axes 18 may each be oriented parallel the with respect to the drum axis 16.

The rolling station 10 may comprise a first guiding element 19. The first guiding element 19 may be configured to confine an invasion of the dough 4, 13 in a first confinement direction 20. The first confinement direction 20 may be oriented transversely, preferably perpendicularly, with respect to the production direction P. The first guiding element 19 may further be configured to support the conveying of the dough 4, 13. The first guiding element 19 may comprise a rotary disc 19a.

As also shown in FIG. 3, the dough processing device 8 may comprise a second guiding element 21. The second guiding element 21 may be configured to confine an evasion of the dough 4, 13 in a second confinement direction 22. The second confinement direction 22 may be oriented opposite to the first confinement direction 20. The second guiding element 21 may be disposed opposite of the first guiding element 19 with respect to the satellite roller 11 and/or the counter roller 12. The satellite roller 11 may be disposed between the first guiding element 19 and the second guiding element 21. As can be seen in the present embodiment, it is conceivable that not all components of the satellite roller 11 are disposed between the guiding elements 19, 21. In particular, the rollers 14 may be disposed between the guiding elements 19, 21. The second guiding element 21 may comprise a rotary disc 21 a as well.

As can be seen in FIG. 3, a distance 23 may be provided between the plates 17 on one hand and each of the rollers 14 on the other hand. The distance 23 may be oriented parallelly with respect to the drum axis 16. The distance 23 may enable space for bearing devices for rotatably supporting the rollers 14 and/or avoid friction between the plates 17 and the rollers 14. The distance 23 may be dimensioned so as to receive the first guiding element 19 and/or the second guiding elements 21. In particular, the rotary disc 19 a may extend into the gap between one of the plates 17 and the rollers 14 provided for by the distance 23. This applies similarly to the second rotary disc 21 a.

Figure 4:
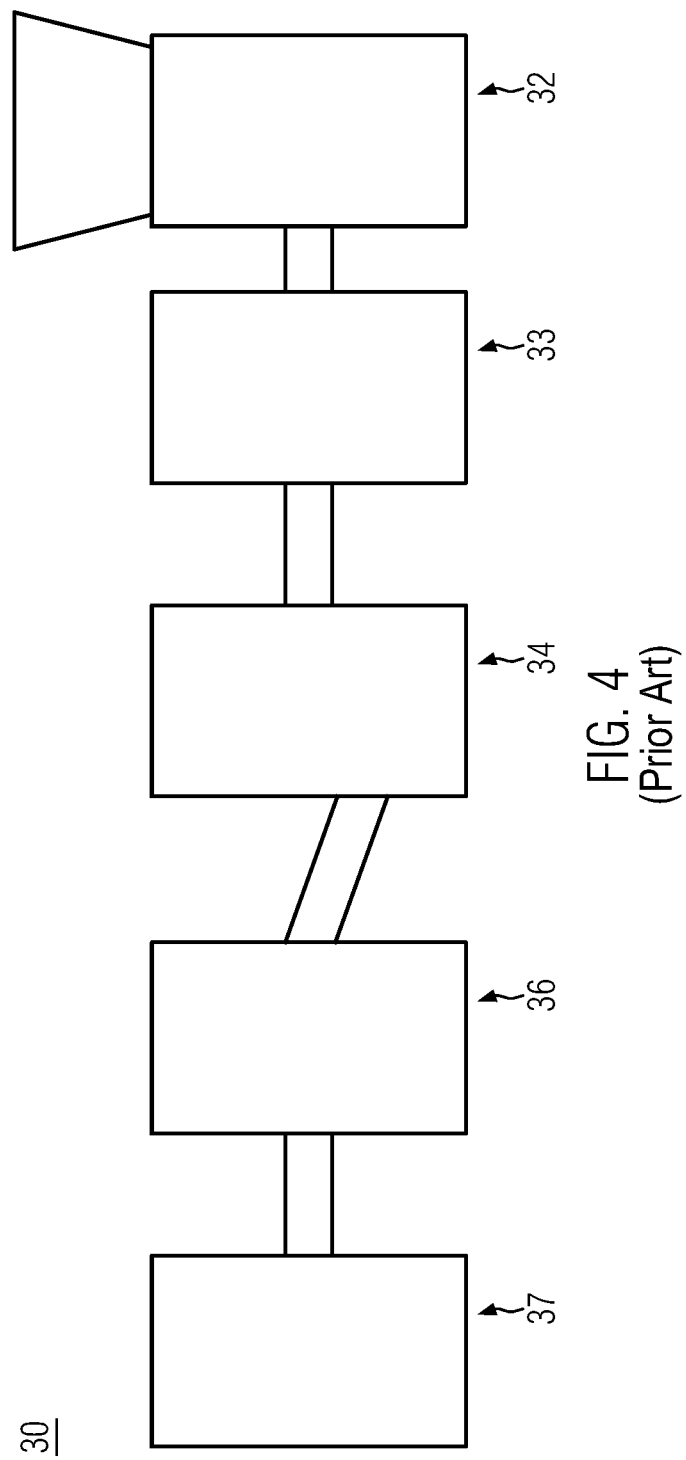
FIG. 4 shows a schematic side view of a dough processing facility having different stations as it is known from the prior art.

In FIG. 4, a schematic side view of a dough processing facility 30 according to the prior art is shown. The dough processing facility 30 comprises a portioning station 32, into which dough may be filled. Downstream of the portioning station 32, a dough sheet forming station 33 is disposed. After a dough sheet has been formed from a substantially unformed dough strand by the dough sheet forming station 33, the dough sheet is rolled to a desired thickness in a rolling station 34. After the desired thickness is achieved, the dough sheet is conveyed further to the further working stations 36 and 37. A skilled person recognizes that the configuration according to the disclosure of the dough processing device 8 may enable an elimination of a separate rolling station as it is necessary in dough processing facilities of the prior art, as for example the dough processing facility 30. This may be beneficial to save floor space for dough processing facilities.

What is claimed is:

1. A dough processing device comprising:
   a conveyor configured to convey dough in a production direction; and
   a rolling station, wherein the rolling station comprises:
   a satellite roller having a drum and at least two rollers configured to engage the dough, wherein the drum is rotatable about a drum axis, and the rollers are revolvable about the drum axis by rotation of the drum, wherein the drum has two plates and the rollers are each disposed between the two plates, and wherein a distance oriented parallelly with respect to the drum axis is provided between the plates and each of the rollers, respectively,
   a counter roller disposed opposite the satellite roller and configured to rotate about a counter roller axis, wherein the rolling station is configured to roll the dough between the satellite roller and the counter roller, and
   a first guiding element comprising a disc having a central axis offset relative to the counter roller axis, the first guiding element configured to confine an evasion of the dough in a first confinement direction oriented transversely with respect to the production direction, wherein the first guiding element is further configured to support the conveying of the dough, wherein the distance is dimensioned to at least partially receive the first guiding element, and wherein the disc of the first guiding element comprises a rotary disc.

2. The dough processing device according to claim 1, wherein the dough processing device comprises a second guiding element configured to confine an evasion of the dough in a second confinement direction oriented opposite to the first confinement direction, the second guiding element comprising a disc having a central axis offset relative to the counter roller axis.

3. The dough processing device according to claim 2, wherein the second guiding element is disposed opposite of the first guiding element with respect to the satellite roller and/or the counter roller.

4. The dough processing device according to claim 2, wherein the disc of the second guiding element comprises a rotary disc.

5. The dough processing device according to claim 4, wherein the rotary disc of the first and/or the second guiding element respectively is drivable.

6. The dough processing device according to claim 5, wherein the rotary disc of the first and/or the second guiding element respectively is motorized and/or synchronized with a conveying speed of the conveyor.

7. The dough processing device according to claim 1, wherein the at least two rollers each are rotatable about a roller axis oriented parallelly with respect to the drum axis.

8. The dough processing device according to claim 1, wherein the at least two rollers each are supported rotatably at the two plates.

9. The dough processing device according to claim 1, wherein the first guiding element is oriented perpendicularly with respect to the production direction.

10. A dough processing facility for producing dough products comprising a dough processing device having
    a conveyor configured to convey dough in a production direction, and
    a rolling station, wherein the rolling station comprises
    a satellite roller having a drum and at least two rollers configured to engage the dough, wherein the drum is rotatable about a drum axis, and the rollers are revolvable about the drum axis by rotation of the drum, wherein the drum has two plates and the rollers are each disposed between the two plates, and wherein a distance oriented parallelly with respect to the drum axis is provided between the plates and each of the rollers, respectively, wherein the rolling station is configured to roll the dough between the satellite roller and a counter roller rotatable about a counter roller axis, and
    a first guiding element comprising a disc having a central axis offset relative to the counter roller axis, the first guiding element configured to confine an evasion of the dough in a first confinement direction oriented transversely with respect to the production direction, wherein the first guiding element is further configured to support the conveying of the dough, wherein the distance is dimensioned to at least partially receive the first guiding element, and wherein the disc of the first guiding element comprises a rotary disc.

11. The dough processing facility according to claim 10, wherein the dough processing device is configured to form a dough sheet from an unformed dough mass.

12. A dough processing device comprising:
a conveyor configured to convey dough in a production direction; and
a rolling station, wherein the rolling station comprises:
- a satellite roller having a drum and at least two rollers configured to engage the dough, wherein the drum is rotatable about a drum axis, and the rollers are revolvable about the drum axis by rotation of the drum,
- a counter roller disposed opposite the satellite roller and configured to rotate about a counter roller axis, wherein the rolling station is configured to roll the dough between the satellite roller and the counter roller, and
- a first guiding element comprising a disc having a central axis offset relative to the counter roller axis, the first guiding element configured to confine an evasion of the dough in a first confinement direction oriented transversely with respect to the production direction, wherein the first guiding element is further configured to support the conveying of the dough, and wherein the disc of the first guiding element comprises a rotary disc.

13. The dough processing device according to claim 12, wherein the dough processing device comprises a second guiding element configured to confine an evasion of the dough in a second confinement direction oriented opposite to the first confinement direction, the second guiding element comprising a disc having a central axis offset relative to the counter roller axis.

14. The dough processing device according to claim 13, wherein the second guiding element is disposed opposite of the first guiding element with respect to the satellite roller and/or the counter roller.

15. The dough processing device according to claim 13, wherein the disc of the second guiding element comprises a rotary disc.

16. The dough processing device according to claim 15, wherein the rotary disc of the first and/or the second guiding element respectively is drivable.

17. The dough processing device according to claim 16, wherein the rotary disc of the first and/or the second guiding element respectively is motorized and/or synchronized with a conveying speed of the conveyor.

18. The dough processing device according to claim 12, wherein the at least two rollers each are rotatable about a roller axis oriented parallelly with respect to the drum axis.

19. The dough processing device according to claim 12, wherein the at least two rollers each are supported rotatably at two plates.

20. The dough processing device according to claim 12, wherein the first guiding element is oriented perpendicularly with respect to the production direction.

* * * * *